Patented Sept. 24, 1929

1,729,416

UNITED STATES PATENT OFFICE

BRUCE K. BROWN, OF TERRE HAUTE, INDIANA, ASSIGNOR, BY MESNE ASSIGNMENTS, TO C. F. BURGESS LABORATORIES, INC., OF DOVER, DELAWARE, A CORPORATION OF DELAWARE

BATTERY DEPOLARIZER

No Drawing. Application filed July 7, 1925. Serial No. 42,093.

This invention relates to a depolarizing mixture consisting essentially of oxide of carbon and a conductive carbon intimately mixed so as to secure a high degree of depolarizing efficiency in galvanic batteries of the Leclanché type. The invention also relates to methods of preparing such depolarizing mixtures.

In a copending application, Patent No. 1,639,983 of Aug. 23, 1927, I have claimed the use of an oxide of carbon, such as graphitic oxide, as a depolarizer in galvanic cells. While such oxides of carbon may be used by merely mixing the oxides with conductive carbon, I have found that better results may be obtained in the cell by subjecting the mixture to a milling operation. The milling operation is not carried out merely to secure an intimate mixture, as in the milling of manganese ore and conductive carbon, but has other functions, as will be disclosed hereinafter. After the milling operation, the mixture may be used directly to mold battery electrodes, after adding sal ammoniac and the necessary water or electrolyte solution. Additional conductive carbon or oxide of carbon may be added to the mix as may be necessary.

The oxide of carbon used for depolarizing, such as disclosed in my above identified application, may be made by chemical oxidation such as the Brodie reaction (Phil. Trans., 149, p. 249, 1859), or by a novel method of electrochemical oxidation as disclosed in my copending application Patent No. 1,639,980 of Aug. 23, 1927, which consists in mounting the carbonaceous material as anode in an oxidizing electrolyte, such as 30% nitric acid at about room temperature, and passing an electric current having a density of about ten amperes per square foot of anode surface. The anode disintegrates to a sludge which is a mixture of carbon and oxide of carbon and may contain as high as 6% by weight of available oxygen. These carbon oxides are colloidal in character, and may be recognized by their peculiar property of deflagrating when heated. These oxides are oxidizing agents under certain conditions and may be used to depolarize galvanic cells in place of the manganese dioxide used in dry cells of the Leclanché type. These oxides are also similar to manganese dioxide in that they are capable of oxidizing reducing agents such as ferrous sulphate. The last reaction may be utilized for determining the available oxygen in the oxide.

While carbon completely oxidized to the oxide of carbon may be used in my novel method of preparing a battery depolarizer, my invention particularly relates to the utilization of carbon which has been only partially oxidized. When carbon, such as graphite, is completely oxidized, it assumes a yellow color, but when only partially oxidized, as when oxidized by electrochemical means, the product is black in color and without the metallic sheen of ordinary graphite. When carbon is partially oxidized, each of the larger grains or particles of the product consists of a core of unchanged carbon surrounded by a shell of the oxide, the thickness of the shell depending upon the degree of oxidation. The shell of colloidal oxide is a poor conductor of the electric current and may be regarded as an insulator.

While granular or powdery oxide of carbon may be utilized for the making of dry cells in much the same proportions and by the same procedure as manganese dioxide is used, I have found that a milling operation increases its efficiency and furthermore the unchanged conductive core of the partially oxidized carbon particles may thereby be utilized to great advantage.

The conductive carbon may be any one of the many forms available. For the manufacture of "flash light" dry cells graphite may be advantageously used. The graphite may be in the impalpable form specified in Patent No. 1,162,449 or may be in any of the other commercial forms supplied to battery manufacturers.

If an oxide of carbon is used which contains little or no unchanged carbon this oxide may be mixed with conductive carbon in the same manner that manganese dioxide and graphite are usually mixed. This secures the proper contact between the conductive carbon and the oxide of carbon.

I have discovered that this intimacy of contact may be increased by a milling operation such as is secured by tumbling in a ball, tube, or rod mill. This milling operation is especially desirable if the graphite does not have the impalpable fineness specified in Patent No. 1,162,449. The milling operation not only secures an intimacy of contact but secures a highly favorable surface-exposure relation. As the milling operation proceeds, the conductivity of the mixture increases and in turn this usually results in increased depolarizing efficiency.

The colloidal oxide of carbon differs from manganese oxide, especially the native pyrolusite, in that it is softer and more readily disintegrated than graphite and other carbonaceous materials instead of being harder. I believe that the milling operation therefore secures an intimacy of contact produced by the disintegration and mutual interpenetration of the conductive carbon and oxide of carbon which differs from the superficial coating of graphite which pyrolusite receives when milled with graphite.

When a partially oxidized carbon is used, obtained by either chemical or electrochemical oxidation, the milling operation has other functions in addition to securing an intimacy of contact. As explained previously, the partially oxidized carbon has a conductive core surrounded by a non-conductive shell. If this product alone is used as a depolarizer the conductive core has little influence on the conductivity of the mixture and the conductivity is low. By subjecting these particles to a milling operation the non-conductive shell of oxide of carbon is stripped from the conductive core, and the conductivity of the mixture rapidly increases. The conductive core is then disintegrated with the non-conductive shell during the milling operation and the necessary interpenetration and intimacy of contact is secured resulting in the requisite conductivity and depolarizing efficiency.

If the proportion of oxide of carbon to conductive core is correct for use as a depolarizing mixture, the milled mass may be used directly without further admixture of conductive carbon or of oxide of carbon. If the proportions of oxide of carbon to conductive carbon are incorrect, these may be corrected before or after milling by the adding of additional oxide of carbon or of conductive carbon as the circumstances require.

I have further determined that an efficient depolarizing mixture may be made by milling a partially oxidized carbon and then mixing with it a granular oxide of carbon (partially oxidized) together with sufficient graphite or other conductive carbon to secure the proper conductivity. The granular oxide is preferably coarser than 20 mesh. Following are typical proportions of such a depolarizing mixture:

15 grams finely ground oxide of carbon depolarizer having 8% available oxygen.
25 grams 20 mesh partially oxidized carbon having 8% available oxygen.
5 grams impalpable graphite.
5.5 grams sal ammoniac.

Throughout the specifications and claims carbon and carbonaceous material is used in the broader sense and includes the graphitic state of the element.

I claim:

1. In the preparation of a battery depolarizer the steps which consist in oxidizing carbon electrolytically, and subsequently milling the oxidized carbon to increase its electrical conductivity.

2. In the preparation of a battery depolarizer, the steps which consist in oxidizing carbon electrolytically, mixing carbon therewith, and milling the mixture.

3. In the preparation of a battery depolarizer, the steps which consist in partially oxidizing carbon, mixing conductive carbon therewith, and subsequently milling the mixture.

4. In the preparation of a battery depolarizer the steps which consist in partially oxidizing carbon, and subsequently milling the partially oxidized carbon to increase its electrical conductivity.

5. In the preparation of a battery depolarizer the steps which consist in partially oxidizing carbon electrolytically, and subsequently milling the partially oxidized carbon to increase its electrical conductivity.

6. In the preparation of a battery depolarizer the steps which consist in partially oxidizing carbon, milling the partially oxidized carbon, and then mixing with conductive carbon to secure the desired electrical conductivity.

7. In the preparation of a battery depolarizer, the steps which consist in partially oxidizing carbon, milling the partially oxidized carbon, and then adding granular oxidized carbon until the desired depolarizing efficiency is obtained.

In testimony whereof I affix my signature.

BRUCE K. BROWN.

CERTIFICATE OF CORRECTION.

Patent No. 1,729,416.  Granted September 24, 1929, to

BRUCE K. BROWN.

It is hereby certified that the above numbered patent was erroneously issued to "C. F. Burgess Laboratories, Inc.", whereas said patent should have been issued to "Burgess Battery Co., Madison, Wisconsin, a Corporation of Wisconsin", said corporation being assignee by mesne assignments of the entire interest in said invention, as shown by the records of assignments in this office; and the said Letters Patent should be read with this correction therein that the same may conform to the record of the case in the Patent Office.

Signed and sealed this 22nd day of October, A. D. 1929.

(Seal)

M. J. Moore,
Acting Commissioner of Patents.